United States Patent Office 3,660,426
Patented May 2, 1972

3,660,426
PROCESS FOR THE PREPARATION OF
4-PYRAZOLIDINOLS
Albert Duncan Cale, Jr., Mechanicsville, and Herndon Jenkins, Richmond, Va., assignors to A. H. Robins Company, Incorporated, Richmond, Va.
No Drawing. Filed June 25, 1969, Ser. No. 836,617
Int. Cl. C07d 49/02
U.S. Cl. 260—310 D                                    4 Claims

ABSTRACT OF THE DISCLOSURE

A novel process for preparation of 1,2-disubstituted-4-pyrazolidinols by the reaction of 1,2-disubstituted hydrazines and an epihalohydrin is described.

---

The present invention relates to 4-pyrazolidinols and is more particularly concerned with 1,2-disubstituted-4-pyrazolidinols and novel processes for their preparation.

The 1,2-disubstituted-4-pyrazolidinols of the present invention may be represented structurally as follows:

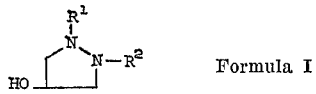

Formula I wherein;

$R^1$ is lower alkyl and $R^2$ is lower alkyl, lower cycloalkyl and phenyl-lower alkyl.

Prior to the discovery of the novel process of the present invention, 1,2-disubstituted-4-pyrazolidinols have been prepared by processess which were at best uncertain, somewhat expensive and time consuming. Methods disclosed in the prior art literature indicate that the reaction between 1,2-disubstituted hydrazines and epichlorohydrin to give 1,2-disubstituted-4-pyrazolidinols has to be carried out under rigorously anhydrous conditions. It is taught that when rigorously anhydrous conditions are not employed, either decreased yields of 1,2-disubstituted-4-pyrazolidinols are realized or in some instances none of the desired product can be isolated. Contrary to the teachings of the prior art, it has been discovered that 1,2-disubstituted-4-pyrazolidinols can readily be prepared in good yield by the reaction of 1,2-disubstituted hydrazines and epihalohydrins or 1,3-dihalo-2-propanols in aqueous basic solution. Maximum yields are realized within considerably shorter reaction periods than those previously disclosed. Furthermore, the methods disclosed in the prior art have been limited to the preparation of 1,2-disubstituted-4-pyrazolidinols wherein the substituents on the 1 and 2 position of the pyrazolidinol ring are the same. In another novel aspect of the present invention, by proper pH control of the reaction medium, 1,2-disubstituted hydrazines wherein the substitutents are different can be prepared in good yield and they can be readily reacted in aqueous basic solution with an epihalohydrin or a 1,3-dihalo-2-propanol to give novel 1,2-disubstituted-4-pyrazolidinols wherein the groups on the 1 and 2 position of the pyrazolidinol nucleus are different. Among the epihalohydrins which can be used, epichlorohydrin is preferred. The preferred 1,3-dihalo-2-propanol is 1,3-dichloro-2-propanol.

The novel process of the present invention provides a method for preparing 1,2-disubstituted-4-pyrazolidinols which are useful intermediates for the preparation of novel benzoate esters of 1,2-disubstituted-4-pyrazolidinols. A series of benzoate esters of 1,2-disubstituted-4-pyrazolidinols is described in copending application Ser. No. 728,065, filed May 9, 1968, now U.S. Pat. 3,542,804, and are shown therein to have excellent local anesthetic properties.

It is, therefore, an object of the present invention to provide a novel process for the preparation of 1,2-disubstituted-4-pyrazolidinols, and also to provide certain novel 1,2-disubstituted-4-pyrazolidinols, wherein the 1,2-substituents are different lower alkyl radicals. It is a further object of the invention to provide a novel process for 1,2-disubstituted-4-pyrazolidinols utilizing economical and readily available starting materials, and, in particular, to provide means for preparing novel 1,2-disubstituted-4-pyrazolidinols where the groups attached to the 1 and 2 position of the pyrazolidinol nucleus can be the same or different. Additional objects of the invention will become apparent hereinafter by a description of the methods of preparation and the examples disclosed.

In the definition of terms used throughout the specification, "lower alkyl" refers to groups containing 1 to 8 carbon atoms in either straight or branched chains such as methyl, ethyl, isopropyl, propyl, butyl, isobutyl, amyl, hexyl, heptyl, octyl and the like.

The term "phenyl-lower alkyl" includes radicals such as the benzyl radical, the phenethyl radical, the phenpropyl radical and the like.

Lower cycloalkyl refers to cycloalkyl groups containing 3 to 7 carbon atoms in the ring and includes groups such as cyclopropyl, cyclobutyl, cyclopentyl, cyclohexyl, and cycloheptyl.

The novel process of the present invention may be represented structurally as follows:

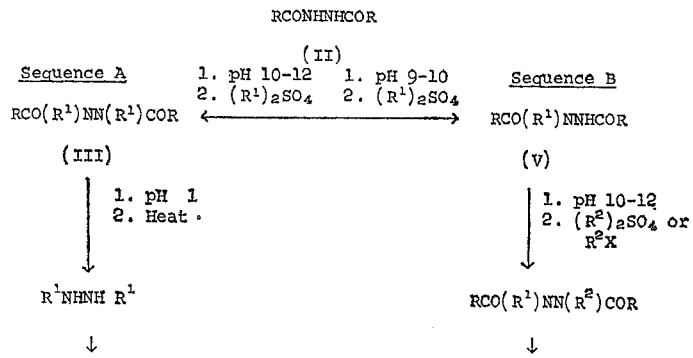

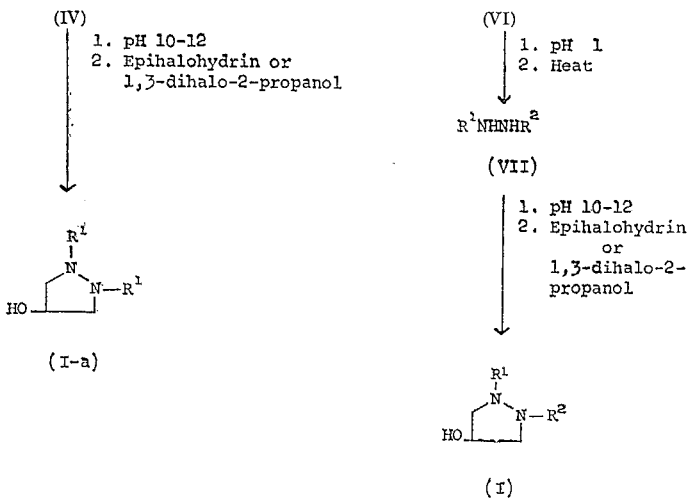

In the reaction sequence given hereinabove, R is lower alkyl and phenyl, and $R^1$ and $R^2$ are as previously defined.

The starting materials used in the present invention are 1,2-diacylhydrazines (II) which are known compounds and which can readily be prepared by methods disclosed in the art.

A general method illustrating one aspect of the novel process which furnishes 1,2-disubstituted-4-pyrazolidinols of Formula I wherein the substituents on the 1 and 2 positions of the pyrazolidinol ring are the same follows sequence A. An aqueous basic solution of a 1,2-diacyl-hydrazine (II) is treated at 90–95° C. with a large excess of a dialkyl sulfate, the pH of the reaction mixture kept at a pH of 10–12, preferably at or near 11.5 by the simultaneous addition of aqueous caustic as, for example, 40% potassium hydroxide solution until maximum conversion to the tetrasubstituted hydrazine (III) has occurred. The tetrasubstituted hydrazine (III) is extracted from the cooled reaction mixture using a suitable solvent, illustratively chlorform, the solvent evaporated from the combined extracts and the residual material refluxed with concentrated hydrochloric acid until complete hydrolysis of the acyl groups has occurred. The pH of the hydrolysis mixture is adjusted to 10–12, an equivalent amount of an epihalohydrin or of a 1,3-dihalo-2-propanol is added and the mixture heated at 40–55° C. until aliquot analysis indicates cyclization to the 1,2 - disubstituted-4-pyrazolidinol (I) has occurred. During the cyclization step 40% aqueous potassium hydroxide is added concurrently to maintain the pH at 9–12, preferably at 10.5–10.8. The product is extracted with a suitable organic solvent, preferably chloroform, the chloroform solution evaporated and the residual oil is distilled in vacuo to give the 1,2-dialkyl-4-pyrazolidinol (I).

In a broader aspect of the novel invention, 1,2-disubstituted-4-pyrazolidinols are prepared by reaction sequence B to yield final products wherein the substituents on the 1 and 2 position of the pyrazolidinol nucleus are different. In practicing this novel aspect of the present invention, it is preferable that the intermediate products are purified when the substituents on the 1 and 2 positions of the precursor hydrazines (VII) are different lower alkyl groups as, for example, in the preparation of 1-ethyl-2-methyl-hydrazine. The starting 1,2-diacylhydrazine is preferably 1,2-dibenzoylhydrazine to permit facile separation of the intermediate products. Thus, 1,2 - dibenzoylhydrazine is suspended in water, the pH is adjusted to 9–10 by the addition of aqueous caustic as, for example, 40% aqueous potassium hydroxide and the temperature raised to about 90–95° C. The stirred basic mixture is treated with a large excess of a dialkyl sulfate accompanied by the simultaneous addition of 40% aqueous potassium hydroxide to maintain a pH of 9–10, preferably 9.5–9.8. Following the addition of the dialkyl sulfate, the reaction mixture is stirred, cooled and extracted with a suitable organic solvent, preferably chloroform; the combined chloroform extracts are evaporated and the residual 1,1,2-trisubstituted hydrazine (V) is purified by crystallization. The purified material is suspended in water, the pH of the aqueous mixture is adjuster to 10–12 by the addition of 40% aqueous potassium hydroxide, the pot temperature is raised to 90–95° C. and a large excess of a different dialkyl sulfate is added dropwise with the simultaneous addition of 40% aqueous potassium hydroxide to maintain a pH of 10–12, preferably 11.5. Following the addition, the reaction mixture is stirred for an additional period of time at the elevated temperature to permit maximum substitution. The reaction mixture is cooled, extracted with chloroform and the combined chloroform extracts concentrated to give the tetrasubstituted hydrazine (VI). The benzoyl groups are removed from the tetrasubstituted hydrazine by refluxing with concentrated hydrochloric acid. The acid hydrolyzate is adjusted to pH 2.5, the benzoic acid by-product is removed by filtration, the pH of the filtrate is raised to 10–12 by the addition of 40% aqueous potassium hydroxide, the pot temperature is raised to 40–55° C. and an equivalent amount of an epihalohydrin or of a 1,3-dihalo-2-propanol based on the amount of starting material is added dropwise to the stirred basic reaction mixture with the simultaneous addition of 40% aqueous potassium hydroxide to maintain the pH at 10–12, preferably at 10.5–10.8. Subsequent to the addition, the reaction mixture is stirred for an additional period of time at 40–55° C., cooled and extrated with chloroform. The combined chloroform extracts are concentrated and the residual oil distilled at reduced pressure to give a 1,2-dialkyl-4-pyrazolidinol (I) wherein the dialkyl groups on the 1 and 2 position are different.

When the substituents on the 1 and 2 positions of the precursor hydrazines (VII) are sufficiently different in size to permit facile separation of product from unreacted materials and by-products, for example, in the preparation of 1 - benzyl-2-methylhydrazine the 1,2-diacylhydrazine used is immaterial.

EXAMPLE 1

1,2-diacetylhydrazine

To 60 g. (1.2 moles) of hydrazine hydrate suspended in 500 ml. of chloroform was added 360 g. (3.5 moles) of acetic anhydride from a dropping funnel at a rate to maintain a pot temperature of 20–30° C. while cooling with an ice bath. When the addition was completed, the mixture was stirred for 30 minutes at 50° C. and filtered. The solid was recrystallized from isopropyl alcohol-isopropyl ether to give 91.0 g. (65%) of material melting at 137–140° C.

EXAMPLE 2

1,2-diacetyl-1,2-diethylhydrazine

To 59 g. (1.0 mole) of 85% hydrazine hydrate was added at 25–30° C. with ice bath cooling 214 g. of acetic anhydride. The pH of the solution was adjusted to seven while cooling at 50° C.; the solution was heated to 90° C. and the pH adjusted to 11.5. To the basic solution was added, over a period of 1.5 hours, 700 ml. of diethylsulfate while maintaining a pot temperature of 90–95° C. and a pH of 11.5–12. The solution was extracted continuously for 2 hours with chloroform. The chloroform solution was dried ($Na_2SO_4$), concentrated and the residue distilled; yield 92 g. (53.5%); B.P. 78–82° C./.05 mm.

EXAMPLE 3

1,2-diethyl-4-pyrazolidinol

To an aqueous solution of 88 g. (1 mole) of 1,2-diethylhydrazine in 300 ml. of water was added dropwise at a rate to maintain a pot temperature of 40–50° C., 93 g. (1 mole) of epichorohydrin with the simultaneous addition of 69 g. (.5 mole) of potassium carbonate at a rate to maintain a basic pH. After the addition was completed, the solution was heated to 40–50° C. for one hour and 100 g. of potassium carbonate added. The mixture was extracted with chloroform, the chloroform dried ($Na_2SO_4$) and concentrated. The residue was distilled; yield 97.5 g. (68.5%); B.P. 133–135° C./40 mm.

EXAMPLE 4

1,2-diethyl-4-pyrazolidinol

To a stirred suspension of 105 g. (.438 mole) of 1,2-dibenzoylhydrazine heated (90° C.) in 900 ml. of water was added 450 ml. of diethylsulfate over a period of 2.5 hours with a simultaneous addition of 40% sodium hydroxide solution at a rate to maintain a pH of 10 slowly rising to 12. The solution was heated an additional 1.5 hours and allowed to cool. The mixture was extracted with chloroform, the chloroform dried ($Na_2SO_4$) and concentrated. The residual oil was refluxed in 250 ml. of concentrated hydrochloric acid for two hours and cooled. The mixture was extracted with 50% benzene-50% isopropyl ether. The acid layer was made slightly basic using solid sodium hydroxide. To the stirred basic solution was added 33 g. (.322 mole) of epichlorohydrin dropwise at 40° C. with the simultaneous addition of 40 g. of potassium carbonate. When the addition was completed the reaction mixture was heated an additional 45 minutes at 45° C. The cooled reaction mixture was extracted with chloroform, the chloroform dried ($Na_2SO_4$), concentrated and the residual oil distilled. The 1,2-diethyl-4-pyrazolidinol weighed 20 g. (32%) and distilled at 130–135° C./40 mm.

EXAMPLE 5

1,2-diethyl-4-pyrazolidinol

To 59 g. (1 mole) of 85% hydrazine hydrate in 50 ml. of water was added at a rapid rate 214 g. (2.1 mole) of acetic anhydride while cooling to 50° C. with an ice bath. The solution was stirred 30 minutes and the pH brought to 12 with 40% potassium hydroxide solution. The solution was heated to 90° C. and 700 ml. of diethylsulfate was added over a period of 2.5 hours while maintaining a pH of 12 with potassium hydroxide. The solution was cooled and extracted with three 250 ml. portions of chloroform. The chloroform was concentrated and the residue (125 g.) treated with 300 ml. of concentrated hydrochloric acid. The acid solution was refluxed 1.5 hours and cooled. The pH was brought to 8.5 with 40% potassium hydroxide and maintained there while 66 g. of epichlorohydrin was added at a rate to maintain a temperature of 50–55° C. The solution was stirred an additional 30 minutes at 50° C. and treated with 200 g. of potassium carbonate and extracted with chloroform. The chloroform was dried ($Na_2SO_4$) and concentrated. The residue was distilled; yield 42.4 g. (29.5%); B.P. 132–134° C./30 mm.

EXAMPLE 6

1,2-diethyl-4-pyrazolidinol

To 200 ml. of concentrated hydrochloric acid was added 125 g. (0.73 mole) of 1,2-diacetyl-1,2-diethylhydrazine and the solution refluxed for two hours. The pH was adjusted to 10.5 while cooling to 40° C. with an ice bath. To the resulting mixture was added dropwise 68 g. (0.73 mole) of epichlorohydrin at a rate to maintain a temperature of 40–55° C. with simultaneous addition of 40% potassium hydroxide to maintain a pH of 10.5. The pH was maintained at 10.5 for 30 minutes after the addition of epichlorohydrin was completed. The mixture was saturated with potassium carbonate and extracted with chloroform. The chloroform was dried ($Na_2SO_4$), concentrated and the residue distilled; yield 70 g. (66.5%); B.P. 140–145° C./50 mm.

EXAMPLE 7

1,2-diethyl-4-pyrazolidinol

To 59 g. (1.0 mole) of 85% hydrazine hydrate was added 214 g. (2.1 moles) of acetic anhydride while cooling to 20–25° C. with an ice bath. The solution was stirred 10 minutes and the pH brought to 7.5 with 40% potassium hydroxide while cooling with an ice bath to 30° C. The solution was heated to 85° C. and 800 ml. of diethylsulfate added at a rate to maintain a temperature of 90° C. with a simultaneous addition of 40% potassium hydroxide at a rate to maintain a pH of 11.5–11.8. The solution was continuously extracted for 18 hours with chloroform. The chloroform solution was dried ($Na_2SO_4$) and concentrated, leaving an oil (wt.=163.5 g.). The oil was dissolved in 300 ml. of concentrated hydrochloric acid and refluxed two hours. The pH was adjusted to 10.5 with 40% potassium hydroxide while cooling to 40° C. with an ice bath. To this was added 88.5 g. (0.95 mole of epichlorohydrin at a rate to maintain 40–55° C. with a simultaneous addition of 40% potassium hydroxide to maintain a pH of 10.5–10.8. The pH was maintained for 30 minutes after the addition of epichlorohydrin was complete. The solution was saturated with potassium carbonate and extracted with chloroform. The chloroform was dried ($Na_2SO_4$), concentrated and the oily residue distilled; yield 72.5 g. (50%); B.P. 142–145° C./50 mm.

EXAMPLE 8

1,2-dibenzoyl-1-ethylhydrazine

To 400 ml. of water was added 40 g. (.166 mole) of 1,2-dibenzoylhydrazine; the pot temperature was raised to 90° C.; the pH was maintained at 9–10 with 40% sodium hydroxide while 250 ml. of diethylsulfate was added to the stirred suspension over a period of about 2.5 hours while the temperature was maintained at 90° C. After the addition was completed, the mixture was stirred at 90° C. for 30 minutes at a pH of 9.5, cooled with an ice bath and extracted with chloroform. The chloroform layer was filtered, the filtrate dried and concentrated. The solid residue was crystallized twice from ethyl acetate-isopropyl ether; M.P. 130–132° C.; yield 10 g.

*Analysis.*—Calculated for $C_{16}H_{16}N_2O_2$ (percent): C, 71.62; H, 6.01; N, 10.44. Found (percent): C, 71.35; H, 6.01; N, 10.50.

EXAMPLE 9

1,2-dibenzoyl-1-ethyl-2-methyl-hydrazine

To 400 ml. of water was added 74 g. (0.276 mole) of 1,2-dibenzoyl-1-ethylhydrazine and the suspension was heated to 90° C. The pH was adjusted to 11.5 and 200 ml. of dimethylsulfate was added over a period of 45 minutes while maintaining a pH of 11.5–12 with 40% potassium hydroxide and a temperature of 90–95° C. The mixture was cooled and extracted with chloroform. The chloroform was concentrated and the residue crystallized from isopropyl ether-ethyl acetate; yield 62 g.; M.P. 72–76° C.

EXAMPLE 10

1-ethyl-2-methyl-4-pyrazolidinol

To 200 ml. of concentrated hydrochloric acid was added 60 g. (0.212 mole) of 1,2-dibenzoyl-1-ethyl-2-methylhydrazine and the mixture refluxed for two hours. The pH was adjusted to 2.5 with potassium hydroxide and the mixture filtered. The pH of the filtrate was adjusted to 10.5 with 40% potassium hydroxide and the solution warmed to 40° C. To the stirred solution was added dropwise, at a rate to maintain a temperature of 40–50° C., 20 g. (0.216) of epichlorohydrin with the simultaneous addition of 15% potassium hydroxide so as to maintain a pH of 10.5–10.8. When the addition of epichlorohydrin was completed, the potassium hydroxide addition was continued for another 20 minutes, keeping the pH at 10.5. At this point, the pH became constant and the solution was saturated with potassium carbonate, causing an oil to separate. The mixture was continuously extracted for three hours with chloroform. The chloroform was dried, concentrated, and the residue distilled; yield 9 g. (32%); B.P. 132–134° C./50 mm.

EXAMPLE 11

1,2-diacetyl-1-benzyl-2-methylhydrazine

To 59 g. (1 mole) of 85% hydrazine hydrate was added over a period of 15 minutes, 214 g. (2.1 moles) of acetic anhydride while cooling with an ice bath to a maximum temperature of 50° C. The pH was adjusted to seven with 40% potassium hydroxide while cooling with an ice bath to 50° C. The temperature was raised to 90° C. and the pH adjusted to nine with 40% potassium hydroxide. To this solution was added a total of 400 ml. of dimethylsulfate over a period of 2.5 hours while maintaining a temperature of 90° C. and a pH of 8.8 to 9.2. The solution was cooled and extracted five times with 200 ml. portions of chloroform. The aqueous layer was reheated to 90° C. and the pH adjusted to 11. Benzylbromide (200 ml.) was added over a period of one hour while maintaining a pH of 11. The resulting mixture was extracted with chloroform, the chloroform dried ($Na_2SO_4$), concentrated and the residue distilled; yield 96 g. (43.5%); B.P. 140–155° C./1 mm. Ten grams of this material was crystallized three times from isopropyl ether; M.P. 46–48° C.

*Analysis.*—Calculated for $C_{12}H_{16}N_2O_2$ (percent): C, 65.43; H, 7.32; N, 12.72. Found (percent): C, 65.26; H, 7.23; N, 12.64.

1,2-diacetyl-1,2-dibenzylhydrazine

The pot residue from the distillation crystallized on standing and was recrystallized from isopropyl alcohol; yield=33.5 g.; M.P. 117–119° C.

*Analysis.*—Calculated for $C_{18}H_{20}N_2O_2$ (percent): C, 72.95; H, 6.80; N, 9.45. Found (percent): C, 72.47; H, 6.70; N, 9.47.

EXAMPLE 12

1-benzyl-2-methylhydrazine

To 200 ml. of concentrated hydrochloric acid was added 86 g. (.39 mole) of 1,2-diacetyl-1-benzyl-1-methylhydrazine and the mixture was refluxed two hours and then made basic with 40% potassium hydroxide. The mixture was extracted with chloroform which was dried ($Na_2SO_4$) and concentrated. The residue was distilled; yield 32 g.; B.P. 122–126° C./20 mm. The fumarate salt was prepared in and recrystallized from isopropyl alcohol; M.P. 132–133° C.

*Analysis.*—Calculated for $C_{12}H_{16}N_2O_4$ (percent): C, 57.13; H, 6.39; N, 11.11. Found (percent): C, 56.96; H, 6.45; N, 10.91.

EXAMPLE 13

1-benzyl-2-methyl-4-pyrazolidinol maleate

To 300 ml. of water was added 30 g. (0.22 mole) of 1-benzyl-2-methyl-hydrazine and the suspension was heated to 40° C. Epichlorohydrin (20.3 g.; 0.22 mole) was added dropwise with simultaneous addition of dilute potassium hydroxide at a rate to maintain a pH of 9 to 10 and a temperature of 50° C. When the addition of the epichlorohydrin was completed, the slow addition of potassium hydroxide was continued to maintain a pH of 9 to 10 for one hour, at which time the natural pH change became very slow (it was necessary to heat the reaction for the last 30 minutes to maintain the temperature of 45–50° C.). The solution was extracted with chloroform; the chloroform dried ($Na_2SO_4$) and concentrated. The residue was distilled; yield 24 g.; B.P. 115–118° C./.05 mm. The maleate salt was prepared and after recrystallization from isopropanol the salt melted at 132–133° C.

*Analysis.*—Calculated for $C_{15}H_{20}N_2O_5$ (percent): C, 58.43; H, 6.54; N, 9.09. Found (percent): C, 58.31; H, 6.50; N, 8.98.

EXAMPLE 14

1,2-diacetyl-1-isopropyl-2-methylhydrazine

In the same manner as described in Example 11, 1,2-diacetyl-1-isopropyl-2-methylhydrazine is prepared using 85% hydrazine hydrate, dimethylsulfate and isopropyl bromide.

EXAMPLE 15

1,2-diacetyl-1-cyclopentyl-2-methylhydrazine

In the same manner as described in Example 11, 1,2-diacetyl-1-cyclopentyl-2-methylhydrazine is prepared using 85% hydrazine hydrate, dimethylsulfate and cyclopentyl bromide.

EXAMPLE 16

1-isopropyl-2-methylhydrazine

In the same manner as described in Example 12, 1-isopropyl-2-methylhydrazine is prepared by acid hydrolysis of 1,2-diacetyl-1-isopropyl-2-methylhydrazine.

EXAMPLE 17

1-cyclopentyl-2-methylhydrazine

In the same manner as described in Example 12, 1-cyclopentyl-2-methylhydrazine is prepared by acid hydrolysis of 1,2-diacetyl-1-cyclopentyl-2-methylhydrazine.

EXAMPLE 18

1-isopropyl-2-methyl-4-pyrazolidinol

In the same manner as described in Example 13, 1-isopropyl-2-methyl-4-pyrazolidinol is prepared from 1-isopropyl-2-methylhydrazine and epichlorohydrin.

EXAMPLE 19

1-cyclopentyl-2-methyl-4-pyrazolidinol

In the same manner as described in Example 13, 1-cyclopentyl-2-methyl-4-pyrazolidinol is prepared from 1-cyclopentyl-2-methylhydrazine and epichlorohydrin.

EXAMPLE 20

1-benzyl-2-methyl-4-pyrazolidinol

In the same manner as described in Example 13, 1-benzyl-2-methyl-4-pyrazolidinol is prepared from 1-benzyl-2-methylhydrazine and 1,3-dichloro-2-propanol.

What is claimed is:

1. A process for the preparation of 1,2-disubstituted-4-pyrazolidinols having the formula:

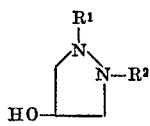

wherein:

$R^1$ is lower alkyl and $R^2$ is selected from the group consisting of lower alkyl, lower cycloalkyl, and phenyl-lower alkyl which comprises reacting a 1,2-disubstituted hydrazine having the formula:

wherein $R^1$ and $R^2$ are as defined above with a compound selected from the group consisting of epihalohydrin and 1,3-dihalo-2-propanol in basic aqueous solution.

2. A process of claim 1 wherein the pH of the aqueous solution is maintained at 9–12.

3. A process of claim 2 wherein the pH of 9–12 is maintained by the continuous addition of aqueous caustic during the reaction.

4. A process of claim 1 wherein the temperature of the reaction mixture is maintained at 40° to 55° C.

References Cited

UNITED STATES PATENTS 3,542,804  11/1970  Daniels _____ 260—310

OTHER REFERENCES

Wiley (editor), "Pyrazoles, Pyrazolines, Pyrazolidines, Indazoles and Condensed Rings," Interscience, New York (1967), pp. 282–3.

HENRY R. JILES, Primary Examiner

G. T. TODD, Assistant Examiner

U.S. Cl. X.R.

260—561 H